United States Patent
Bhargava

(10) Patent No.: US 10,920,015 B2
(45) Date of Patent: *Feb. 16, 2021

(54) MEDIUM AND HIGH MOLECULAR WEIGHT LONG CHAIN ALIPHATIC NYLONS AND METHODS OF MAKING SAME

(71) Applicant: Shakespeare Company, LLC, Boca Raton, FL (US)

(72) Inventor: Saumitra Bhargava, Clarksville, MD (US)

(73) Assignee: SHAKESPEARE COMPANY LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,683

(22) Filed: Jun. 15, 2018

(65) Prior Publication Data

US 2018/0291150 A1 Oct. 11, 2018

Related U.S. Application Data

(63) Continuation of application No. 15/073,035, filed on Mar. 17, 2016, now Pat. No. 10,023,696.

(60) Provisional application No. 62/136,186, filed on Mar. 20, 2015.

(51) Int. Cl.
| | |
|---|---|
| C08G 69/26 | (2006.01) |
| C08G 69/28 | (2006.01) |
| C09D 177/06 | (2006.01) |
| B32B 27/34 | (2006.01) |
| B32B 27/00 | (2006.01) |
| B32B 27/06 | (2006.01) |
| B32B 27/28 | (2006.01) |

(52) U.S. Cl.
CPC .............. C08G 69/28 (2013.01); B32B 27/00 (2013.01); B32B 27/06 (2013.01); B32B 27/28 (2013.01); B32B 27/34 (2013.01); C08G 69/26 (2013.01); C08G 69/265 (2013.01); C09D 177/06 (2013.01); B32B 2307/50 (2013.01)

(58) Field of Classification Search
CPC ........ C08L 77/06; C08G 69/26; C08G 69/265
See application file for complete search history.

(56) References Cited

U.S. PATENT DOCUMENTS

| | | | |
|---|---|---|---|
| 3,502,624 A | 3/1970 | Flack et al. | |
| 4,055,525 A | 10/1977 | Cheng | |
| 10,023,696 B2* | 7/2018 | Bhargava | ............... B32B 27/34 |
| 2011/0301290 A1* | 12/2011 | Kato | ..................... C08G 69/26 |
| | | | 524/606 |

FOREIGN PATENT DOCUMENTS

| | | | |
|---|---|---|---|
| JP | 56147743 | * | 11/1981 |
| JP | H09-132709 A | | 5/1997 |
| WO | 2014/078137 A1 | | 5/2014 |

OTHER PUBLICATIONS

Bennett et al., "Synthesis and characterization of polyamides containing octadecanedioic acid: nylon-2, 18, nylon-3, 18, nylon-4, 18, nylon-6, 18, nylon-8, 18, nylon-9, 18, and nylon-12, 18"; Wiley Periodicals, Inc. J Polym Sci Part A: Polym Chem 43: 936-945, 2005.

Ehrenstein et al., "New polyamides with long alkane segments: nylon 6.24 and 6.34", P. Polymer, 41, 2000, pp. 3531-3539.

* cited by examiner

*Primary Examiner* — Gregory Listvoyb

(74) *Attorney, Agent, or Firm* — Eversheds Sutherland (US) LLP

(57) ABSTRACT

Medium and high molecular weight long chain aliphatic nylons and methods of making the same. A method of making medium and high molecular weight nylons is described, which not only produces consistent products, but products with enhanced properties such as impact resistance and chemical resistance.

18 Claims, 1 Drawing Sheet

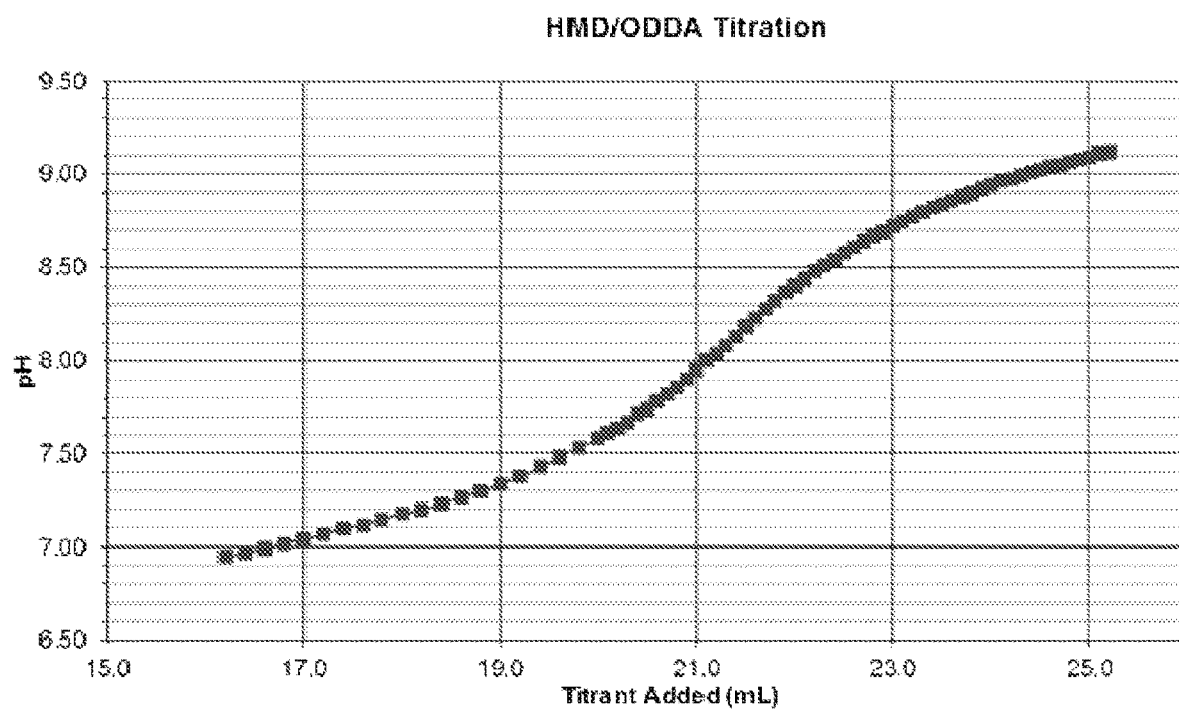

MEDIUM AND HIGH MOLECULAR WEIGHT LONG CHAIN ALIPHATIC NYLONS AND METHODS OF MAKING SAME

CROSS-REFERENCE TO RELATED APPLICATION

This application is a continuation of U.S. application Ser. No. 15/073,035, filed Mar. 17, 2016, which claims priority to provisional patent application Ser. No. 62/136,186 filed Mar. 20, 2015, the disclosure of each of which is herein incorporated by reference.

TECHNICAL FIELD

The field of art to which this invention generally pertains is nylon materials, and particularly methods of making such nylon materials.

BACKGROUND

Managing the reactions for the production of medium and high molecular weight long chain aliphatic nylons has been found to be challenging for a number of reasons. And even in those instances when the challenging conditions to produce such products can be managed, being able to duplicate such reaction conditions to the fine degree necessary to repeatedly produce the same products can add additional challenges. And even when done with relatively small samples, scale up to commercial production adds yet another later of complication and challenge to such production.

The embodiments described herein address these challenges.

BRIEF SUMMARY

A method of making aliphatic nylon polymers and/or copolymers, is described including mixing at least one diamine with at least one diacid having 12 or more aliphatic carbon atoms, in a solvent comprising water, titrating the mixture to its balance point, and polymerizing the mixture, resulting in medium to high molecular weight polymers with consistent molecular weight, and consistent mechanical and chemical resistant properties.

Additional embodiments include: the method described above where wherein the diamine is hexamethylene diamine and the diacid is octadecanedioic acid; the method described above where wherein the solvent additionally contains one or more $C_3$ to $C_6$ alcohols and their isomers; the method described above where wherein the solvent additionally contains isopropanol; the method described above where wherein the nylon polymer is a copolymer of nylon 618 and nylon 66; the method described above where wherein the nylon polymer is a copolymer of nylon 618 and nylon 612; the method described above where wherein the diacid comprises a mixture of two or more $C_6$ to $C_{22}$ diacids; the method described above where the diacid comprises at least one $C_{12}$ to $C_{22}$ diacid.

Additional embodiments described include medium and high molecular weight nylons produced by the method described above; molded, extruded and film articles formed of such polymers; and articles, such as metal articles, coated, extruded with or laminated with such polymers.

These and additional embodiments are further described below.

BRIEF DESCRIPTION OF THE DRAWINGS

The FIGURE depicts a representative end point titration of an embodiment described herein.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Nylon 618 is produced from two monomers: hexamethylene diamine and octadecanedioic acid. Octadecanedioic acid has been available from Cognis Corp since 2003 under the name EMEROX 118 and from Elevance Renewable Sciences. However, commercial production of this material has proved to be challenging. One reason for this is believed to be the challenges in producing consistent reasonable molecular weight materials with consistent reasonable mechanical and chemical properties. It is difficult to even find many publications describing crystallization and thermal stability of nylon 618. For example, in one publication ("Synthesis and characterization of polyamides containing octadecanedioic acid: nylon-2,18, nylon-3,18, nylon-4,18, nylon-6,18, nylon-8,18, nylon-9,18, and nylon-12,18", by Carl Bennett; Lon J. Mathias, Wiley Periodicals, Inc. J Polym Sci Part A: Polym Chem 43: 936-945, 2005) a molecular weight of only approximately 11,000 grams (g)/mol is described. And no mechanical properties are reported. Another publication ("New polyamides with long alkane segments: nylon 6.24 and 6.34", by Ehrenstein, M.; Dellsperger, S.; Kocher, C.; Stutzmann, C.; Weder, C.; Smith, P. Polymer 2000, 41, 3531-3539) describe the production of higher aliphatic diacid nylons, were able to achieve 35,000 molecular weight, but required impractical method which would be difficult to commercialize. Salt of dicrarboxylic diacid with hexamethylenediamine were purified by recrystallization from THF or a (1.5 volume/volume) mixture of dioxane and toluene. This method allowed Ehrenstein to achieve a balance and thus polymerize to high molecular weight. But is a very complex and laborious process, and also presents no measured mechanical properties. And EP 1961787B1 (granted 2009 Apr. 2015) to EMS Chemie, discloses advantages of filled nylon compositions containing N618 and other nylon, with a relative viscosity of N614 indicating low to medium molecular weight. It should also be noted that all viscosity data is based on 614 and only points to low molecular weight material.

Molecular weights above 20,000 g/mol result in nylon with minimum mechanical properties for certain injection molding application. Weights above 30,000 (e.g., 40,000, 50,000, 60,000, 70,000, 80,000 etc.) would be desirable, and even above 80,000 g/mol would be particularly useful, especially for producing coated, molded and extruded products with enhanced mechanical, impact, and chemical resistance properties.

Past inabilities to achieve minimum molecular weights for coating, molding and extrusion applications is one reason holding back successful commercial production of such nylons. The methods described herein provide consistent production of medium and high molecular weight nylon 618, copolymers of nylon 618, nylon 418 and other such nylon polymers, with the enhanced properties described above.

The process described herein allows for the production of medium and high viscosity nylon 618 and nylon 618 copolymers, among others, including, but not limited to, production of nylon 618, nylon 618 copolymers and nylon 418. The process described herein provides for the controlled production of these nylon resins, and others, with consistent molecular weight suitable for commercial applications.

Octadecanedioic diacid (ODDA) has negligible solubility (less than 0.05 g/liter) in water. The solubility of the ODDA is enhanced by mixing hexamethylene diamine (HMD) when preparing nylon salt from the two ingredients. However, the salt is only partially soluble even at 175° F. and even at a 40% (by weight) concentration in water. It has been found that temperatures at or above of 195° F. can produce stable salt solutions with concentrations in excess of 45%, and even as high as 60%, or higher, providing unique solutions leading to enhanced, consistent processing, and enhanced resultant nylon materials and nylon containing products. Processing salt solutions at these temperatures appears to be at least 25° F. higher than any currently known high temperature processing for nylon 612 or nylon 66 salts, for example.

Along with the use of these high temperatures, careful end balance of diacid and diamine is required to achieve the medium and high viscosity polymers described herein. A formulation with even slight end imbalance leads to lower viscosity (and hence lower molecular weight) nylon polymer, with inferior properties, such as brittleness. Measurement of ends is challenging as the salt can become insoluble in the measurement process by pH meter. This in turn can lead to poor end-balance control which can result in low molecular weight and poor control in polymer properties. However, the method developed to measure end balance, for example, of nylon 618 and nylon 618 copolymer salts includes measuring the pH of the salt in a 1:1 volumetric solution of water and isopropyl alcohol at 2.5 weight percent of the salt. For the particular reaction mixture, for example, the balance end point was identified as a pH of 8.1 pH. Therefore, it is important to adjust the pH of the mixture, for example by adding the hexamethylene diamine or octadecanedioic acid, until you get to the inflection point, and then the polymerization process can be started—using conventional heat, pressure, condensation, and water boil off processing conditions—until the viscosity is achieved which indicates the medium to high molecular weight polymer desired with the improved properties described, is achieved. An adjustment in HMD (hexamethylene diamine) post addition can be used to adjust end balance or to account for loss during production.

Example

A high molecular weight nylon 618 is prepared as follows. 725.9 grams (g) of hexamethylene diamine/water solution at 71 weight (wt) % concentration as received from Ascend Performance Materials is diluted with 2700 ml of deionized water and heated to 90° C. To this diamine solution, 1394.3 g of octadecanedioic received from Elevance Renewable Sciences is added slowly. Target amounts of materials are added based on stoichiometric balance numbers provided by suppliers. The mixture is stirred for an hour in a covered vessel resulting in a clear solution with no suspended solids (of interest, the molecular weight is back-calculated to be only 40 units—around 10,000 g/mol—if the polymerization is carried out just based on the stoichiometric balance numbers alone.)

Separately, a 40 ml solution composed of isopropyl alcohol and water at 50/50 volume/volume % is mixed with 1 ml of the hexamethylene diamine-octadecanedioic acid salt solution described above. In this case, a pH of 8.41 is measured and a total of 32.0 g of ODDA is added until a pH of 8.1 is achieved. The attached graph shows a representative end point titration of the ODDA. Adjustment for any loss of HMD during polymerization can be made if necessary following measurement of the pH balance point.

The mixture is next subject to conventional processing steps, such as heating to 180° C. and 130 pounds per square inch (psi), subsequent heating to 215° C. while holding the vessel pressure to 200 psi, the combined steps removing the majority of the water. Then, the vessel is depressurized slowly to 0 psi. During depressurization, the temperature of the reactor rises to a maximum of 268° C. Once at atmospheric pressure, the vacuum is applied until a desired torque or viscosity is reached (specific to the vessel being used, for example, as measured by a transducer on the agitator motor, e.g., about 2.0 amps). Maximum vacuum applied in this case is 27 inches mercury.

The resulting polymer has the following representative properties: a density of 1.04 g/cm$^3$ (cubic centimeter), water absorption (24 hour immersion) of less than 0.33%, melting temperature of 193° C., tensile modulus of 1186 MPa dry as molded, tensile modulus 1082 MPa for conditioned, tensile strain at break of greater than 170%, flexural modulus of 1365 MPa, tensile strain at yield of 5.9%, Izod notched impact strength (23° C.) of approximately 1.51 foot*pound/inch for dried as molded and melt flow of 2.3 g/10 minutes per ASTM D648. The high elongation at break value and good impact strength are indicative of high molecular weight polymer. Further, melt flow indicates a high viscosity or molecular weight polymer.

It is of interest to contrast this work versus preparation of low molecular weight nylon 618 and nylon 618 6T copolymer described by Bennett and Mathias (cited above) as well as Martens et. al. ("Thermoplastic melt-blended compositions, WO 2014078137 A1, Nov. 19, 2012, Marvin M. Martens, et. al.") This last document, for example, discloses N618 6T copolymers, renewably sourced offering, 35+% glass filled. In glass filled systems, high viscosity prevents processing. The focus described herein, on the other hand is on extrusion grade, medium to high viscosity semi-crystalline materials. And in all of the documents, one needs to charge known weights of monomers in an autoclave and apply heat and pressure to solubilize and start reaction. Once appropriate temperature is reached, water of condensation is removed resulting in molten nylon polymer. The methods described therein results in low molecular weight nylon resin from improper end balance. The method described herein, by comparison, including careful end balance achieves a high molecular weight nylon suitable for extrusion.

Similar end balance high temperature processing can be used in the production of nylon 613 using brassylic acid, nylon 614 using tetradecanedioic acid, nylon 615 using pentadecanedioic acid and nylon 616 using hexadecanedioic acid, for example.

Nylon 618 has particularly high commercial potential as it offers flex modulus between that of nylon 12 and nylon 11. The material has comparable modulus, elongation at break and toughness to unmodified nylon 11 and nylon 12. Further, the nylon 618 polymer has at least comparable chemical resistance to nylon 11 and nylon 12. And the ability to offer these properties while maintaining sustainable (biobased) starting ingredients makes the technology even more valuable.

Besides homopolymers of nylon 618 and nylon 418, copolymers containing nylon 618 can also be made using the processing conditions described herein. For example, nylon 618 copolymerized with (by weight) 5-10% nylon 612 offers improved toughness. In addition, 5-10% of nylon 618 copolymerized with nylon 612 improves toughness of nylon 612.

Medium and high molecular weight nylon 618 and nylon 618 copolymers with their enhanced properties can have particular applications in such areas as automotive tubing, extrusion coatings, extruded films and filtration fabrics, etc.

As described above, a method of making nylon polymers and copolymers such as nylon 618 by combining hexamethylene diamine and octadecanedioic acid at temperatures of at least 195° F. leads to a stable salt solution with a concentration typically of about 45 to about 60% by weight, suitable for nylon production. The process described herein requires careful end balance of diacid and diamine to accomplish the results described herein. This process including careful end balance allows achieves high molecular weight nylon suitable for extrusion, coating, molding etc. And the ability to accomplish controlled production of these nylon resins with consistent molecular weights makes enhanced commercial production and applications possible.

While acids produced from conventional petroleum based processes can be used with the process described herein, acids produced from typical biotech processes can also be used with the processed described herein. In such processes, sugars and other plant materials, including vegetable oils and vegetable oil waste (canola, corn, peanut, etc.) are typically processed into a mixture of $C_2$, $C_3$, $C_4$, $C_5$, $C_6$, $C_8$, $C_{10}$, $C_{12}$, $C_{14}$, $C_{16}$, $C_{18}$, etc. acids. Current processes also attempt to isolate or purify the resulting products into single acids. But the process described herein can process the acid mixture produced as well. This can result in much higher carbon efficiency for the entire process. For example, nylon 618 can be generated with the process describe herein as bio-based material, making consistent quality nylon resin. Nylon 618 would be produced form 100% $C_{18}$ diacid, but copolymers such as nylon 612 or nylon 618 could be produced from these mixed diacids streams, i.e., $C_9$, through $C_{22}$ or whatever mixture produced, as well. And regardless of what product is produced by the process described herein, consistency in the product generated enhanced mechanical properties such as impact resistance and chemical resistance results.

Because of the enhanced properties of the nylon polymers produced herein, nylon 618 for example, these polymers would have utility in a variety of applications, such as metal coatings, extruded and coating films, tubing, chemical barrier coatings, oxygen barrier coatings, etc. For example, the nylon polymers produced by the process described herein can be used with enhanced results in those applications where conventional nylons such as nylon 12 are currently being used, such as in barrier coatings in solar cells.

As mentioned above, the higher weight nylon polymers produced by the process described herein is so chemical resistant that it can't be dissolved in typical solvents. Accordingly, the molecular weight of these polymers is typically measured based on their viscosity. So, for example, even solvents described in the past to measure nylons with molecular weights in the 10,000 range will not work for the 30,000 g/mol and above molecular weights produced by the process described herein. And the higher the molecular weight of the nylon polymers produced herein, the better the mechanical, chemical, barrier, etc. properties produced. Also of interest, the modulus of elasticity of such materials can be up to 1100 MPa, for example, impact properties enhanced up to 10 times with a molecular weight increase of 6 times, chemical resistance enhanced with increase in molecular weight, elongation and break other properties enhanced significantly as well.

As mentioned above, one of the benefits of the process described herein is the consistency of molecular weight produced, which is especially important for commercial production. And this applies regardless of the material being produced, for example, medium (30,000 g/mol) and high (80,000 g/mol) molecular weight materials, nylon 418 and nylon 618 copolymers. And as also mentioned above, the process described herein can work with nylons produced form mixed diacids of medium to high molecular weight as well, for example, mixed nylons 613, 614, 615, 616, etc. with consistent molecular weight and properties as a result of being able to measure and manage the process as described herein.

Manufacturers of diacids typically actually measure acid content, e.g. by dissolving and titrating. For example, a $C_6$ diacid has water solubility of about 20 to 30 grams per deciliter. But long chain diacids such as ODDA, have low solubility and therefore would be present in low concentrations, e.g., 0.5 grams per liter in water. This makes them very difficult to actually measure with conventional methods. This difficulty in measuring concentration of these long chain diacids presents special problems when trying to combine these diacids with diamines necessary for polymerization. As long as the diacids and the diamines are balanced in the mixture, the polymerization reaction will keep going. But longer the chain, the closer these numbers need to be together. For example, even if the numbers are off by 1 molecule in 100, the chain will terminate and polymerization stop. Adding the AA (acid molecules) and BB (base molecules), forming BAAB (polymer molecules), with one molecule too many the reaction will terminate, i.e., not enough B for A or vice versa.

With the process described herein, when the solution is balanced as a diamine-diacid salt, reactant balance can be accomplished to the degree that even more than 100 molecules can "attach" and produce high molecular weights of 30,000 g/mol to 80,000 and more.

The titration measure described herein allows for accurate balance of the materials at the particular level required to attain the medium and high molecular weight levels desired. It provides accurate balance to within a molecule for every 4 to 5 hundred reactant molecules or more. Even with the most accurate metering methods currently available, one can easily be off by 1% or more. Typical titrations are done just in water. But since the long chain diacids (e.g., $C_{18}$) necessary to attain the high molecular weight materials being sought have minimal solubility in water, alcohols such as isopropyl alcohol are added to the water to help dissolve the diacids to the necessary level for titration to provide the true reading described above. Representative examples of usable alcohols to mix with the water to provide the necessary solubility include isopropanol, ethanol, tertiary butyl alcohol, and other $C_3$ to $C_6$ alcohols and their isomers. With mixed diacids if the mixture has any $C_{13}$ or above diacids the process works particularly well because of their otherwise poor solubility in water.

Another important aspect of the process described herein is the temperature at which the diamine-diacid salt is prepared. At 175° F., for example, the salt will not form with long chain diacids. So the temperature of the salt solution should be run at as high a temperature as possible without evaporating water, approaching but not at 212° F. In the typical process described herein, conventional mix vessel produces partial reflux, but if such things as a conventional reflux condenser is include in the process, it is possible to go as high as 210° F., for example. A pressurized vessel would allow reaching yet higher temperatures for salt preparations.

As described above, by itself ODDA has very low solubility in water, for example about 0.05 g/l. However, by creating the salt and raising the temperature, solubility can be increased to 600 g/l and more. So by neutralizing with HMD to make the salt, and raising the temperature, the desired concentration of materials can be attained to produce the medium and high molecular weight materials desired. To efficiently make a nylon as described herein the concentration of the ingredients is typically above 40% by weight. The HMD in liquid form is typically diluted with water. The acid, which is normally a solid, is next added and balanced as a salt. The ingredients are reacted, the water removed, resulting in the nylon polymer. If the temperature not raised to the levels described, the concentrations are so low the process would not be economically feasible. Typically temperatures of 195° F. and above are used. Upper limit may be 210° F. to 212° F. to limit water boil off. In most cases the 195° F. temperature provides the concentrations desired. For a nylon 66 salt or a nylon 612 salt, the temperatures used are typically about 25 degrees cooler than that. So such high temperatures are generally not considered for nylon reactions.

As mentioned above, it is important that the amine and acid groups balance to get the molecular weights and properties desired, as shown in the titration curve. Every material has its own curve. For example, for the curve shown in the FIGURE, the balance takes place at a pH of 8.1 (the inflection point for hexamethylene diamine and octadecanoic acid). This is where the process point is balanced to. Following this, the temperature of the mixture is raised under pressure, and the water driven off. "AA" and "BB" will start to condense and form longer and longer chains. The viscosity can be measured using the torque of the agitator present in the reaction mixture. When the desired viscosity and thus molecular weight is achieved, the reaction is complete. If the balance point is not used, one could end up producing such things as aldehydes and ketones as well. Measuring the pH of the salt solution, and titrating with acid and base to see exactly what the curve looks like, the inflection point is determined from the plot, the point where the plotted curve shows the biggest jump. As can be seen from the FIGURE, the curve is really flat away from the inflection point, on both sides. And as stated above, each material has its own unique inflection point. For example, mixed diacids have a different number. The use of naphthalene diamine and butane diamine, will change inflection point, as will $C_5$ diamines.

In the area of the mixed diacids, mixtures of $C_{12}$ and smaller molecules are all soluble in water, however, if the mixture contains $C_{13}$ and above diacids, negligible solubility in water can present problems and therefore invite the use of the process described herein. The process is applicable to diacids $C_6$ through $C_{22}$, but the presence of any $C_{13}$ diacids are where the real benefits of the process are realized, since this is where their presence will impede the dissolution of the diacid mixture. $C_{12}$ to $C_{18}$ diacids mixture are particularly well suited for the process described herein, especially if they are $C_{18}$ rich. By measuring such things as acid number, for example, by HPLC (High Performance Liquid Chromatography) the relative amounts of $C_{12}$ to $C_{18}$, etc. can be determined. With the higher carbon chains in the diacids mixtures, (weight average) molecular weights of the polymers produced will be at least 30,000 g/mol, be consistently produced, e.g., for scale up, and will have the enhanced properties discussed above. Only about 5 milligrams of the mixture needs to be titrated to obtain the balance point, for example, for a 5,000 pound reactor making 5,000 pounds of salt and yet the mixture is being balanced to molecule level.

The products described herein because of their enhanced mechanical and chemical resistant properties have particular utility in applications which could take advantage of such properties, such as, for example, in films or extruded coatings on metals. This is a particular advantage for the medium to high molecular weight polymers produced from mixed diacid streams. One example is in the area of coated products for automotive use. Materials contained in road salt, for example (especially extremely damaging materials such as zinc chloride from road salt) embrittles such materials as nylon 6 and 66. Nylon 612, 12 and 11 which can fare better in such environments, are significantly more expensive to produce. And because of the oxygen barrier properties of the materials described herein, the medium to high molecular weight polymers produced herein would also have particular utility in applications which could take advantage of such properties (at much lower cost), such as, for example, as gaskets or films in solar cells, currently typically made out of nylon 12. Other representative advantageous uses include, among others: wherever tough nylon resins could be used, for trimmer line polymers and copolymers, again, especially for material made with mixed diacids, tough coatings for metal brake lines such as stainless steel brake line coming from brake fluid cylinders. For all of these applications, the materials described herein can provide advantages (including cost benefits) over materials currently being used, such as nylon 6, nylon 12 and nylon 612, for example.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What I claim is:

1. A method of making aliphatic nylon polymers and/or copolymers, comprising,
   mixing at least one diamine with at least one diacid having 13 or more aliphatic carbon atoms to form a diamine-diacid salt solution;
   removing a sample of the diamine-diacid salt solution and dissolving the sample of the diamine-diacid salt solution in a solvent comprising one or more $C_3$ to $C_6$ alcohols present in water in an amount of about 50% by volume, to form a dissolved diamine-diacid solution;
   titrating the dissolved diamine-diacid solution to determine its balance point;
   calculating the amount of diamine or diacid needed to bring the diamine-diacid salt solution to its balance point;
   adding the calculated amount of diamine or diacid to the diamine-diacid salt solution to form a mixture; and
   polymerizing the mixture to form a nylon polymer or copolymer,
   wherein the nylon polymer or copolymer has a molecular weight greater than about 30,000 g/mol,
   wherein the nylon polymer or copolymer comprises nylon 613, nylon 614, nylon 615, nylon 617, or nylon 618.

2. The method of claim 1, wherein the diamine is hexamethylene diamine and the diacid is octadecanedioic acid.

3. The method of claim 1, wherein the solvent comprises isopropanol.

4. The method of claim 1, wherein the nylon polymer is a copolymer of nylon 618 and nylon 66.

5. The method of claim 1, wherein the nylon polymer is a copolymer of nylon 618 and nylon 612.

6. The method of claim 1, wherein the diacid comprises a mixture of two or more $C_6$ to $C_{22}$ diacids.

7. The method of claim 6, wherein the diacid comprises at least one $C_{12}$ to $C_{22}$ diacid.

8. The method of claim 1, wherein the nylon polymer or copolymer is suitable for extrusion.

9. The method of claim 1, wherein the nylon polymer or copolymer has a modulus of elasticity of up to about 1100 MPa.

10. A method of making aliphatic nylon polymers and/or copolymers, comprising,
    mixing at least one diamine with at least one diacid having 13 or more aliphatic carbon atoms to form a diamine-diacid salt solution;
    removing a sample of the diamine-diacid salt solution and dissolving the sample of the diamine-diacid salt solution in a solvent comprising one or more $C_3$ to $C_6$ alcohols present in water in an amount of about 50% by volume, to form a dissolved diamine-diacid solution;
    titrating the dissolved diamine-diacid solution to determine its balance point;
    calculating the amount of diamine or diacid needed to bring the diamine-diacid salt solution to its balance point;
    adding the calculated amount of diamine or diacid to the diamine-diacid salt solution to form a mixture; and
    polymerizing the mixture to form a nylon polymer or copolymer,
    wherein the nylon polymer or copolymer has a molecular weight greater than about 30,000 g/mol,
    wherein the nylon polymer is a copolymer of nylon 618 and nylon 66 or is a copolymer of nylon 618 and nylon 612.

11. The method of claim 10, wherein the diamine is hexamethylene diamine and the diacid is octadecanedioic acid.

12. The method of claim 10, wherein the solvent comprises isopropanol.

13. The method of claim 10, wherein the diacid comprises a mixture of two or more $C_6$ to $C_{22}$ diacids.

14. The method of claim 13, wherein the diacid comprises at least one $C_{12}$ to $C_{22}$ diacid.

15. The method of claim 10, wherein the nylon polymer or copolymer is suitable for extrusion.

16. The method of claim 10, wherein the nylon polymer or copolymer has a modulus of elasticity of up to about 1100 MPa.

17. An aliphatic nylon polymer or copolymer prepared by the method of claim 1.

18. An aliphatic nylon polymer or copolymer prepared by the method of claim 10.

* * * * *